A. VIËTOR.
SPRING WHEEL.
APPLICATION FILED AUG. 1, 1912.
1,046,907.
Patented Dec. 10, 1912.
2 SHEETS—SHEET 1.
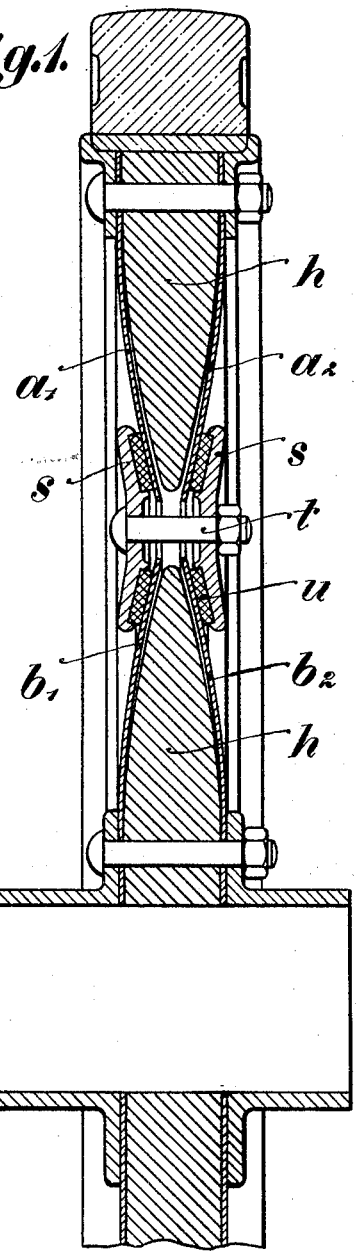
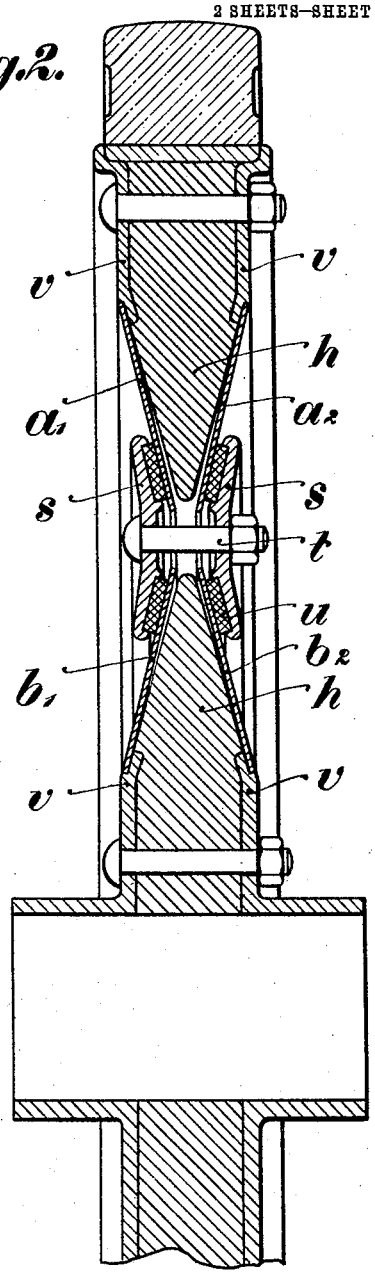

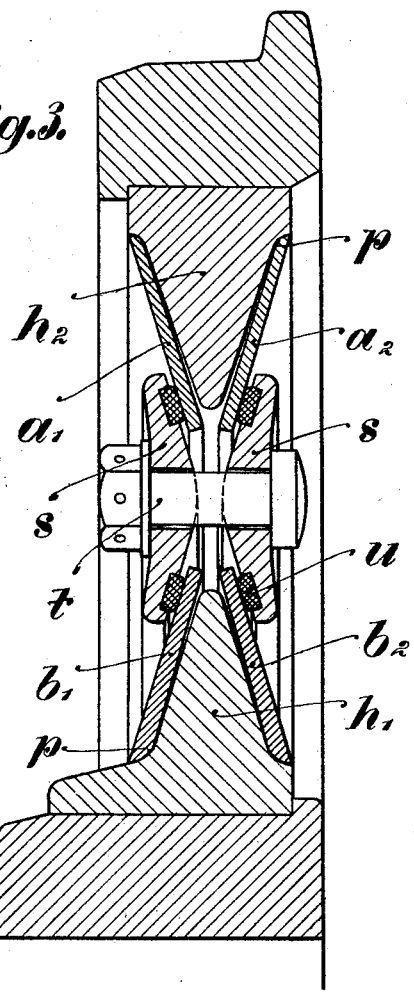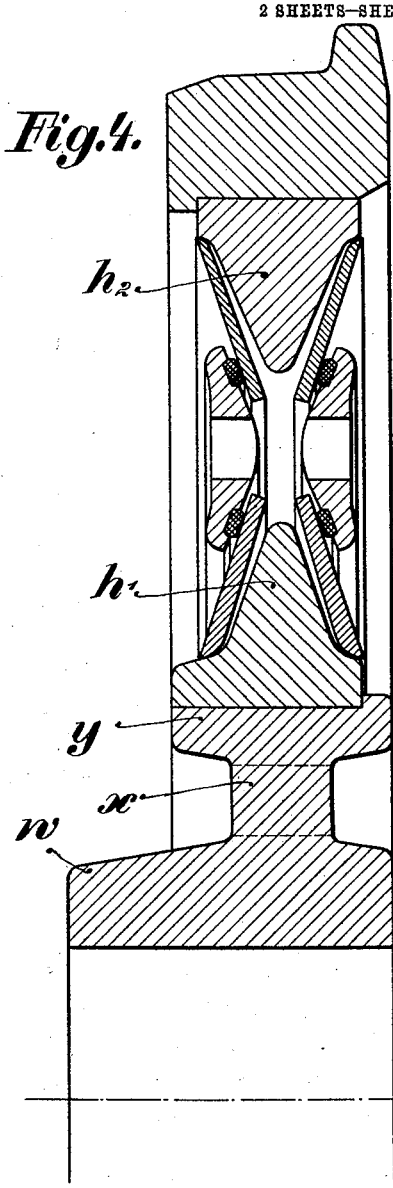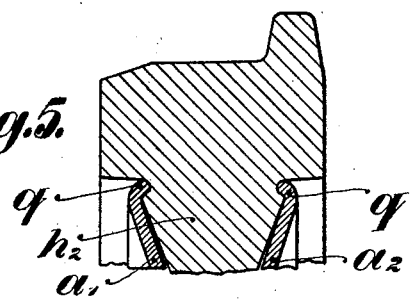

UNITED STATES PATENT OFFICE.

ALWIN VIËTOR, OF WIESBADEN, GERMANY.

SPRING-WHEEL.

1,046,907.  Specification of Letters Patent.  Patented Dec. 10, 1912.

Application filed August 1, 1912.  Serial No. 712,730.

*To all whom it may concern:*

Be it known that I, ALWIN VIËTOR, subject of the King of Prussia, and resident at Wiesbaden, in the Province of Hessen-Nassau, Kingdom of Prussia, German Empire, have invented a certain new and useful Spring-Wheel, of which the following is a specification.

The present invention relates to a spring wheel for vehicles of all kinds especially for automobiles and railway cars.

The invention consists in the provision of a pair of spring disks disposed between the rim, on the one hand, and the hub on the other hand, the adjacent edges of said disks being overlapped by adjustable tension rings which are held in operative position by transverse bolts.

In the drawings various constructions of the invention are illustrated in section through the wheel.

Figure 1 is a vertical section of one form of applicant's device. Fig. 2 is a similar view of a modified form of this invention. Figs. 3 and 4 are vertical sections of another modification of this invention showing wheels designed particularly for railway purposes, Fig. 3 showing the wheel with all the parts assembled, and Fig. 4 illustrating the wheel before the tensioning bolts are applied. Fig. 5 is a vertical section of a portion of the device showing a modification of the means for securing the spring rings to the rim.

In the form illustrated in Fig. 1, the annular spring disks $a^1$ $a^2$ and $b^1$ $b^2$ reach on the outside up to the rim and on the inner side down to the hub and are firmly held at the base so that they bend in a curve when under tension. When not in tension the annular disks are almost or completely flat. For the establishment of the connection according to this invention the tension rings $s$ are applied at each side, and are drawn together by means of the screw bolts $t$. By means of these bolts the tension of the disks can be regulated at any time. At the points of contact the rings $s$ are provided with washers $n$ of vulcanized fiber, friction metal or the like. Between the spring disks of both parts of the wheel are placed preferably wooden rings $h$, which fit in the interval between the adjacent disks leaving the necessary space for the play of the springs. They thus limit the strain as soon as the disks come to rest upon them.

According to the second modification (Fig. 2) the rings $a^1$ $a^2$ $b^1$ $b^2$ are of less width than the corresponding parts, shown in Fig. 1, and are placed without any fastening means in suitable holding rings $v$, in which they retain themselves by means of the pressure exercised upon them in the direction of the axis by the tension rings $s$. This construction has the advantage over the first one, that the disks require less material, and that in consequence of having no fixing screws they do not require to be perforated, by reason of which the transverse resistance might be weakened.

In the further modification illustrated in Figs. 3 to 5, an improvement on the springing can be obtained by the arrangement of the annular disks, which are formed in a narrower conical form, in the unstretched condition, so that strong spring rings can be applied without over tension in the unloaded condition of the wheel, and moreover the springing in the working can be regularly limited, because a minimum spring action between the axle and the rim suffices completely for the production of the desired effect. A further advantage of the wheels constructed according to Figs. 3 to 5, consists in the annular disks diminishing in thickness from their interior to their exterior portions. This arrangement insures that the smaller spring rings seated on the rim adapt themselves in their strength to the larger rings seated on the hub, and prevent the hub spring rings from prematurely becoming unsteady in their position.

The rings are rounded and thickened at the points where they abut inside against the body of the hub and outside against the body of the rim, and are exactly fitted in corresponding recesses in both these parts of the wheel, so that when the tension rings are secured and the spring action takes place full surface contact remains assured at the adjacent parts.

To render easier the mounting and repairs the hub body as well as the rim are preferably formed in two parts. By this means also a quicker interchange of the separate parts or of several parts of the wheel connected one with the other becomes possible. By the division of the rim, the special advantage is also attained, that the wheel on running around curves cannot ring, inasmuch as the two parts of the rim possess different degrees of vibration.

Fig. 3 shows a wheel of this kind in the stretched and Fig. 4 in the unstretched condition. The rings $a^1$ $a^2$ and $b^1$ $b^2$ are conical when not under tension as may be seen from the drawing. Their strength as shown in the drawing gradually diminishes from the interior outward. At the points of contact with the bodies $h^1$ $h^2$ they are thickened and rounded and rest in corresponding recesses $p$. The parts $h^1$ $h^2$ form special rings separated from the rims and from the hub, which in the well known manner are connected with their respective bodies by being shrunk on. In the construction illustrated in Fig. 4 the hub proper $w$ is also provided with an over hub $y$ and is connected with it into one piece by means of the annular connection $x$. This construction still further facilitating the mounting and repair and effects at the same time while retaining one and the same external diameter of the wheel a desired reduction of the weight of the parts not under strain, which are formed by the rims of the ring $h$ and the two outer spring rings.

In order to prevent that in the event of a breakage of the rim, a broken piece should fly out entirely, the spring rings $a^1$ $a^2$ shown in Fig. 5 may be bent inward at their outer edges, so that hook shaped projections $q$ are formed, which projections engage in correspondingly formed grooves of the rim body. These hooked edges as well as the grooves are rounded off. In this construction the rims together with the parts $h^2$ are preferably formed of one piece. In this manner all parts of the rim are held radially fast by the spring rings $a^1$ $a^2$.

What I claim and desire to secure, is—

1. A spring wheel having a hub and rim and comprising annular spring disks extending outwardly from said hub, and annular spring disks extending inwardly from said rim, annular rings adapted to press said disks toward each other between said hub and said rim, and means to adjustably hold said disks in a desired position.

2. A spring wheel having a hub and rim and comprising annular spring disks extending outwardly from said hub, and annular spring disks extending inwardly from said rim, annular rings adapted to press said disks toward each other between said hub and said rim and transverse bolts adapted to hold said disks in operative position.

3. A spring wheel having a hub and a rim and comprising annular spring disks extending outwardly from said hub, and annular spring disks extending inwardly from said rim, extensions on said rim and said hub and directed toward each other, inwardly inclined flanges on the inner edges of said extensions, annular spring disks engaging outwardly of said flanges, and annular rings overlapping said disks for the purpose specified.

4. A spring having a hub and a rim, conical members extending from said hub and said rim toward each other, spring disks between said hub and said rim with their confronting faces adapted to contact with said conical members and with their edges engaging said hub and rim, annular rings between said hub and said rim adapted to be pressed toward each other, washers between said disks and said rings, and bolts adapted to hold said disks, said rings, and said washers in operative position.

In testimony, whereof I have signed my name to this specification in the presence of two subscribing witnesses.

ALWIN VIËTOR.

Witnesses:
BARTHEL ETZENBACH,
LOUIS VANDORN.